July 3, 1928.  1,676,195
J. F. MacWILLIAMS
APPARATUS FOR TESTING COILS
Filed Oct. 28, 1924
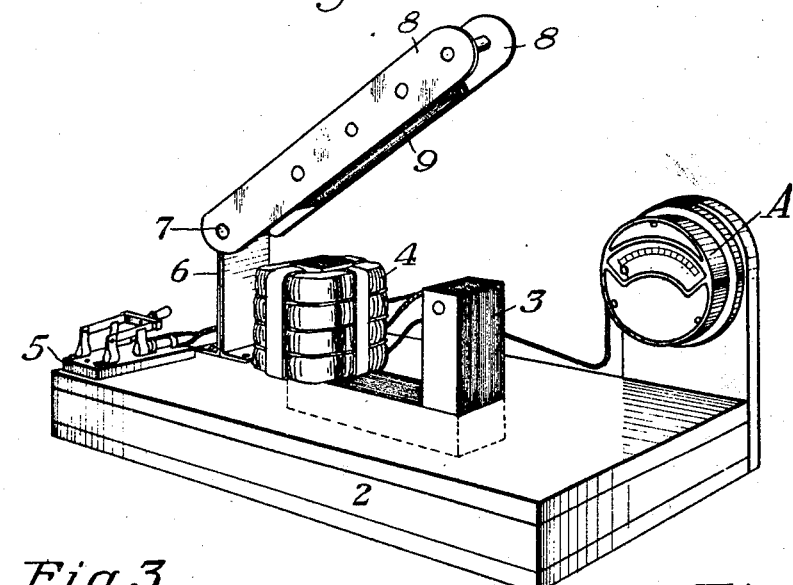
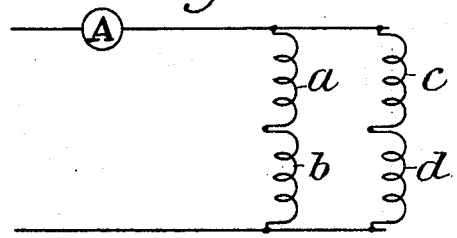
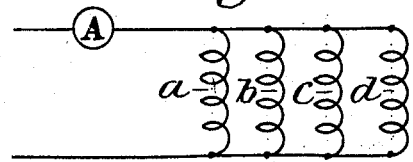
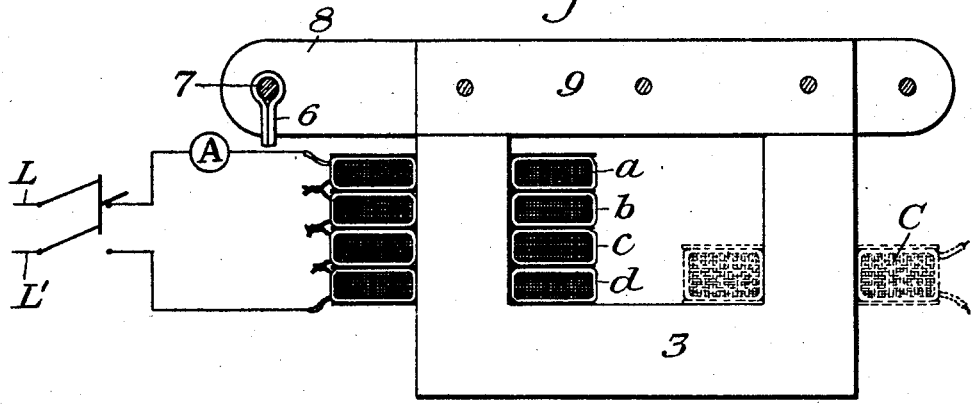
INVENTOR
James F. MacWilliams,
by Byrnes, Sullivan & Parmelee,
his attys.

Patented July 3, 1928.

1,676,195

UNITED STATES PATENT OFFICE.

JAMES F. MacWILLIAMS, OF CRESSON, PENNSYLVANIA.

APPARATUS FOR TESTING COILS.

Application filed October 28, 1924. Serial No. 746,339.

The present invention relates broadly to testing instruments, and more particularly to apparatus for testing coils.

It is frequently desirable to test coils of wire for the purpose of determining whether or not there are any short circuits therein, without the necessity of providing any special measuring apparatus or source of current. The present invention provides apparatus by means of which such coils may be easily and quickly tested.

In the accompanying drawings there is shown, for purposes of illustration only, a preferred embodiment of the present invention, it being understood that the drawings do not define the limits of the invention as changes in the construction and operation shown therein may be made without departing from the spirit of the invention or scope of my broader claim.

In the drawings:—

Figure 1 is a perspective view of a testing instrument embodying the present invention, Figure 2 is a diagrammatic view illustrating a portion of the instrument shown in Figure 1, Figure 3 is a diagrammatic view illustrating a modified method of connecting the units of the primary coil, and Figure 4 is a view similar to Figure 3 illustrating still another method of connecting the coil units.

In accordance with the present invention there may be provided a base 2 of suitable construction adapted to receive therein a suitable core 3. This core is preferably of the well known character comprising a series of laminations of soft iron, and may be conveniently of generally U-shape as illustrated. One of the legs of the core may have applied thereto a primary coil 4 comprising any desired number of units $a$, $b$, $c$ and $d$. In the embodiment of the invention illustrated, four of these units are provided. In Figure 2 of the drawings these are shown as connected in series whereby they may be utilized with a 440 volt circuit. In the event the primary coil is to be used with a 220 volt circuit the units may be connected in multiple series as illustrated in Figure 3, while if they are to be used with a standard 110 volt circuit they may be connected in parallel as shown in Figure 4.

The base 2 preferably has mounted thereon a suitable switch 5 which may conveniently be of the double-pole single-throw type adapted to connect line wires L and L' to the primary coil. One side of the circuit to the primary coil is preferably completed through an indicator, such as an ammeter A, for indicating the current flow through the primary winding.

Mounted on the base adjacent the leg of the core carrying the primary winding is a support 6 which may conveniently be formed of strip metal having its upper portion shaped to receive a bearing pin 7. This pin extends transversely through the side members 8 carrying therebetween a series of laminations 9 adapted to cooperate with the legs of the core and complete the flux path thereof.

In Figure 1 of the drawings the movable side of the core is shown in elevated position, whereby the free leg thereof is adapted to easily receive a coil C to be tested, as indicated in dotted lines in Figure 2. After the coil to be tested has been placed in position, the movable side of the core is swung downwardly to come into contact with the upper ends of the U-shaped portion and thereby complete the flux path. As is well understood, should the coil being tested be free from any short circuit the current flow through the primary winding will not vary, but will remain of the character ordinarily referred to as a wattless current. On the other hand, if the coil C should contain a short circuit, it will constitute in effect a closed secondary circuit, thereby immediately changing the conditions of flow through the primary. This will result in a greater current flow through the primary winding, as may be readily observed from an inspection of the indicating means provided.

It will be apparent that the apparatus disclosed herein provides means adapted for use with different circuits whereby coils may be quickly tested. In the event the apparatus is required for use with circuits having a higher voltage than those set forth herein the number of units in the primary coil may be varied at will, or other changes made therein as well understood in the art.

The advantages of the present invention arise from the provision of means whereby coils may be quickly and easily tested irrespective of the voltage of the circuit available for such testing purposes.

I claim:

An apparatus for testing coils, comprising a core having a primary coil thereon and adapted to receive as a secondary the coil to be tested, and means for indicating the current flow through the primary coil, said primary coil comprising a plurality of units adapted to be connected in different relationship for use with circuits of different voltages.

In testimony whereof I have hereunto set my hand.

JAMES F. MacWILLIAMS.